US010375028B2

(12) United States Patent
Helms et al.

(10) Patent No.: US 10,375,028 B2
(45) Date of Patent: Aug. 6, 2019

(54) RECEIVE DEVICE MANAGEMENT REQUEST THROUGH FIREWALL

(71) Applicant: HEWLETT-PACKARD DEVELOPMENT COMPANY, Houston, TX (US)

(72) Inventors: Janine L Helms, Boise, ID (US); Donald J Gathman, Boise, ID (US); Timothy P Blair, Boise, ID (US); Roger T Baird, Boise, ID (US); Sandra A Matts, Boise, ID (US); Benjamin Houchard, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 121 days.

(21) Appl. No.: 15/307,285

(22) PCT Filed: Jul. 3, 2014

(86) PCT No.: PCT/US2014/045374
§ 371 (c)(1),
(2) Date: Oct. 27, 2016

(87) PCT Pub. No.: WO2016/003466
PCT Pub. Date: Jan. 7, 2016

(65) Prior Publication Data

US 2017/0048194 A1 Feb. 16, 2017

(51) Int. Cl.

| | |
|---|---|
| ***H04L 29/06*** | (2006.01) |
| ***H04L 29/08*** | (2006.01) |
| ***H04L 12/24*** | (2006.01) |

(52) U.S. Cl.
CPC ........ *H04L 63/029* (2013.01); *H04L 41/0226* (2013.01); *H04L 41/28* (2013.01);
(Continued)

(58) Field of Classification Search
CPC .................................................... H04L 63/029
See application file for complete search history.

(56) References Cited

U.S. PATENT DOCUMENTS 8,570,550 B2 10/2013 Pothos et al.
2002/0149789 A1* 10/2002 Okazawa ............. G06F 1/3215 358/1.14

(Continued)

FOREIGN PATENT DOCUMENTS

| | | |
|---|---|---|
| JP | 2011253351 | 12/2011 |
| KR | 20050022730 A | 3/2005 |
| WO | WO-0239246 A2 | 5/2002 |

OTHER PUBLICATIONS

Zanten, M.C.V., Remote Control of Device Behind Firewall Using a Restful Service, (Thesis/Research Paper), Sep. 7, 2012,—First 24 pages of 162 pages.

*Primary Examiner* — Samson B Lemma
*Assistant Examiner* — Richard W Cruz-Franqui
(74) *Attorney, Agent, or Firm* — HP Inc. Patent Department

(57) ABSTRACT

Examples disclosed herein relate to a device management request from a remote management service. Examples include receipt of a device management from a remote management service through a firewall in a first device. The first device to provide the device management request to a second device via a local network and to receive a device management response from the second device. The first device to provide the device management response to the remote management service.

12 Claims, 4 Drawing Sheets

(52) U.S. Cl.
CPC .............. *H04L 67/02* (2013.01); *H04L 67/16* (2013.01); *H04L 69/18* (2013.01)

(56) References Cited

U.S. PATENT DOCUMENTS

| | | | | |
|---|---|---|---|---|
| 2003/0172308 | A1 | 9/2003 | Imai | |
| 2004/0100651 | A1* | 5/2004 | Leone, III | G06F 3/1205<br>358/1.15 |
| 2007/0226223 | A1 | 9/2007 | Lindsley | |
| 2008/0189781 | A1 | 8/2008 | Pathak et al. | |
| 2010/0217837 | A1* | 8/2010 | Ansari | G06Q 30/04<br>709/218 |
| 2011/0058208 | A1* | 3/2011 | Takahashi | G06F 3/1222<br>358/1.14 |
| 2011/0179134 | A1 | 7/2011 | Mayo et al. | |
| 2011/0258305 | A1 | 10/2011 | Chen et al. | |
| 2011/0296520 | A1* | 12/2011 | Erofeev | H04L 63/0209<br>726/14 |
| 2012/0151571 | A1* | 6/2012 | Shatsky | H04L 63/0227<br>726/11 |
| 2013/0254367 | A1* | 9/2013 | Nakajima | H04L 41/00<br>709/223 |
| 2015/0256638 | A1* | 9/2015 | Schwartz | H04L 67/2828<br>709/203 |

* cited by examiner

RECEIVE DEVICE MANAGEMENT REQUEST THROUGH FIREWALL

BACKGROUND

Various types of devices, communicating over different protocols, may be used in a networked environment. A remote service may communicate with and monitor a networked environment protected by a firewall in response to requests from networked devices. In some examples, a single device may communicate with the remote service by forwarding communication from other devices to the remote service for monitoring.

BRIEF DESCRIPTION OF THE DRAWINGS

The following detailed description references the drawings, wherein.

DETAILED DESCRIPTION

Figure 1:
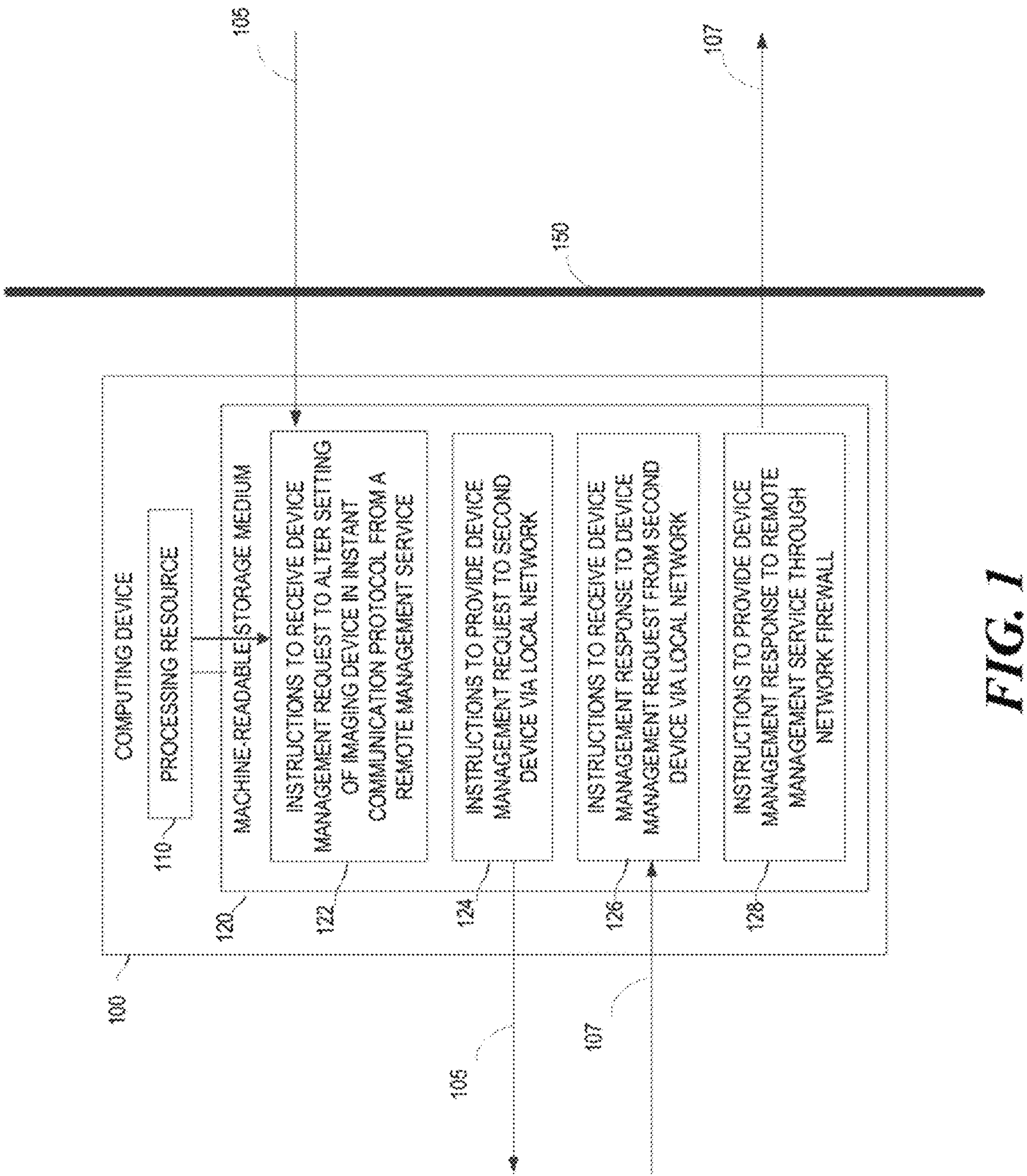
FIG. 1 is a block diagram of an example computing device to provide a device management request from a remote management service to a local network.

As used herein, a "device management request" ("management request") is an instruction (i.e., command) executable by a computing device to perform at least one function to alter at least one setting of an imaging device. A "computing device" or "device" may be a desktop computer, laptop or notebook) computer, workstation, tablet computer, mobile phone, smart device, server, blade enclosure, imaging device, or any other processing device or equipment. An "imaging device" may be a hardware device, such as a printer, multifunction printer (MFP), or any other device with functionalities to physically produce graphical representation(s) (e.g., text, images, models etc.) on paper, photopolymers, thermopolymers, plastics, composite, metal, wood, or the like. In some examples, an MFP may be capable of performing a combination of multiple different functionalities such as, for example, printing, photocopying, scanning, faxing, etc. For example, the function with respect to an imaging device may be to reboot the imaging device, troubleshoot the imaging device, upgrade firmware, retrieve consumable level information, clone features, adjust security settings, perform a test, perform device discovery, alter trap events, retrieve a scan, execute a print request, clear an alert, etc.

A device management request may be a real time management request. As used herein, a "real time" management request refers to a function of a message in which a response to the message is requested from the destination device in real time. For example, a real time management request may be understood to control an imaging device receiving the request to receive data, process the data, and return the results of the process sufficiently quickly to affect the imaging device at that time (e.g., in milliseconds).

In examples described herein, a "remote management service" may be a service implemented by at least one device to generate and provide a device management request to a computing device in a remote location (i.e., not directly connected to the remote management service) protected by a firewall. A "firewall" may be a network security system that controls incoming and outgoing network traffic based on an applied set of rules. All communications (e.g., data packets) which flow in and out of the network must pass through the firewall. The firewall may selectively permit the communications to pass (e.g., based on protocols) from one network to another to provide bidirectional security. A firewall may establish a barrier between an internal network and an external network (e.g., the Internet). The internal network may include, for example, a local area network (LAN), a wireless local area network (MAN), a virtual private network (VPN), or the like, or a combination thereof. For example, given the variety of different functions that may be desired, a remote management service may generate a management request to an imaging device protected by a firewall to enter low power mode at a particular time. In such examples, a responsive message from the imaging device may be sent to the remote management service to confirm the management request has been received or implemented, and/or provide the results of the implementation of the management request, such as an error message. As used herein a "device management response" may refer to a responsive message from the imaging device to the remote management service.

A remote management service may manage a plurality of computing devices behind a firewall. However, not all computing devices may be able to communicate through the firewall with the remote management service. For example, some imaging devices may not be able to communicate with an external network (e.g., the Internet). In such examples, a secondary device in the networked environment may be used to communicate with some imaging devices. The secondary device may forward messages from the remote management service to the imaging device. However, in order to forward messages via the secondary device, the secondary device and the remote management service must establish a connection through the firewall. In order to establish this connection, secondary devices may request a connection to the remote management service (e.g., "poll" the remote management service). The remote management service may respond to the connection request and establish a connection with the second device through the firewall. Such a connection scheme may require sophisticated programming logic to ensure a connection is established at the necessary time for device management. For example, the connection scheme may require large memory and/or processing allocation in the secondary device. The large memory and/or processing allocation may place size restrictions on the scalability of such a remote management system.

To address these issues, in the examples described herein, a remote management service may establish a connection with a device protected by a firewall in a local network without receiving a connection request from any device in the local network. In such examples, the device in the local network may forward device management requests in real time from the remote management service to the imaging device via the local network. In examples described herein, the device may act as a proxy for a plurality of devices in the local network. The scalability of a remote management system employing the device may increase because the device receives the connection request from the remote management service. If the device fails to forward the device management request, the remote management service may forward the device management request to a second device in the local network for forwarding to the target device. In this manner, examples described herein may significantly simplify device management from a remote management service.

Referring now to the drawings, FIG. 1 is a block diagram of an example computing device 100 to provide a device management request 105 from a remote management service to a local network. In the example of FIG. 1 computing device 100 includes a processing resource 110 and a machine readable storage medium 120 comprising (e.g., encoded with) instructions 122, 124, 126, and 128 executable by processing resource 110. In some examples, storage medium 120 may include additional instructions. In some examples, instructions 122, 124, 126, and 128, and any other instructions described herein in relation to storage medium 120, may be stored on a machine-readable storage medium remote from but accessible to computing device 100 and processing resource 110 (e.g., via a computer network). In some examples, instructions 122, 124, 126, and 128 may be instructions of a computer program, computer application (app), agent, or the like, of computing device 100. In other examples, the functionalities described herein in relation to instructions 122, 124, 126, and 128 may be implemented as engines comprising any combination of hardware and programming to implement the functionalities of the engines, as described below.

In examples described herein, a processing resource may include, for example, one processor or multiple processors included in a single computing device (as shown in FIG. 1) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

As used herein "local network" refers to a computing network protected by a firewall in which devices may be connected to each other. The devices may be connected to each other through a wired connection (e.g., local area network (LAN), etc.) or a wireless connection (e.g., wireless local area network (WLAN), Wi-Fi, Bluetooth, etc.).

In the example of FIG. 1, instructions 122 may passively acquire (i.e., receive) in computing device 100 from a remote management service a device management request 105 through a firewall 150. In such example, the computing device 100 may acquire the device management request 105 without prior communication with or "polling" of the remote management service for the device management request 105. As used herein "polling" or to "poll" refers to a transmission by a first device of a request for information from a second device. In some examples, the device management request 105 may be a request to alter a setting of an imaging device in a local network protected by firewall 150.

In the examples described herein, the device management request 105 may be a real time management request. The device management request 105 may be a wrapped message of a first protocol. As used herein a "wrapped" message refers to a message (e.g., computer instructions or commands) of a first protocol which contains a message of a second protocol encapsulated or "tunneled" therein. In some examples, the first protocol and the second protocol may be the same protocol.

In the examples described herein, the first protocol may be a protocol to traverse a firewall. The first protocol may be an application layer protocol, such as a protocol for instant or real time communication ("instant communication protocol") or a protocol to establish persistent connection ("persistent connection protocol"). Extensible Messaging and Presence Protocol (XMPP) is an instant communication protocol and a persistent communication protocol which may traverse firewalls. Through XMPP, a message may be sent in real time without receiving a prior request for the message from a target device receiving the message (i.e., a "push" transmission mechanism). In some examples, the first protocol may be long polling, WebSocket, Microsoft Message Queuing (MSMQ), Internet Message Access Protocol ("IMAP"), Internet Relay Chat (IRC), Windows Messenger Service, Session Initiation Protocol (SIP), Multipurpose Internet Mail Extensions (MIME), etc.

In instructions 124, the computing device 100 may provide device management request 105 to a second device via the local network. In some examples, computing device 100 may unwrap the device management request 105 into a second protocol and transmit the unwrapped message to the second device. As used herein, to "unwrap" refers to the extraction of a message encapsulated in a wrapped message. The second protocol many be any protocol which may be wrapped into a persistent connection protocol or an instant communication protocol. In some examples, the second protocol may be a device management protocol to manage a device ("device management protocol"). For example, a device management protocol may be XMPP, Hypertext Transfer Protocol (HTTP), Hypertext Transfer Protocol Secure (HTTPS), Simple Network Management Protocol (SNMP), Simple Object Access Protocol (SOAP), or any other protocol to communicate with a computing device. In some examples, the firewall may not allow messages of the second protocol to pass through the firewall.

In instructions 126, computing device 100 may receive a device management response 107 from the second device via the local network.

In instructions 128, computing device 100 may provide device management response 107 to the remote management service through the firewall 150. In some examples, device management response 107 may be wrapped into a second protocol (e.g., XMPP, HTTP, etc.), and the wrapped device management response may be provided to the remote management service.

In some examples, instructions 122, 124, 126, and 128 may be part of an installation package that, when installed, may be executed by processing resource 110 to implement the functionalities described herein in relation to instructions 122, 124, 128, and 128. In such examples, storage medium 120 may be a portable medium, such as a CD, DVD, flash drive, or a memory maintained by a computing device from which the installation package can be downloaded and installed. In other examples, instructions 122, 124, 126, and may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-3.

Figure 2:
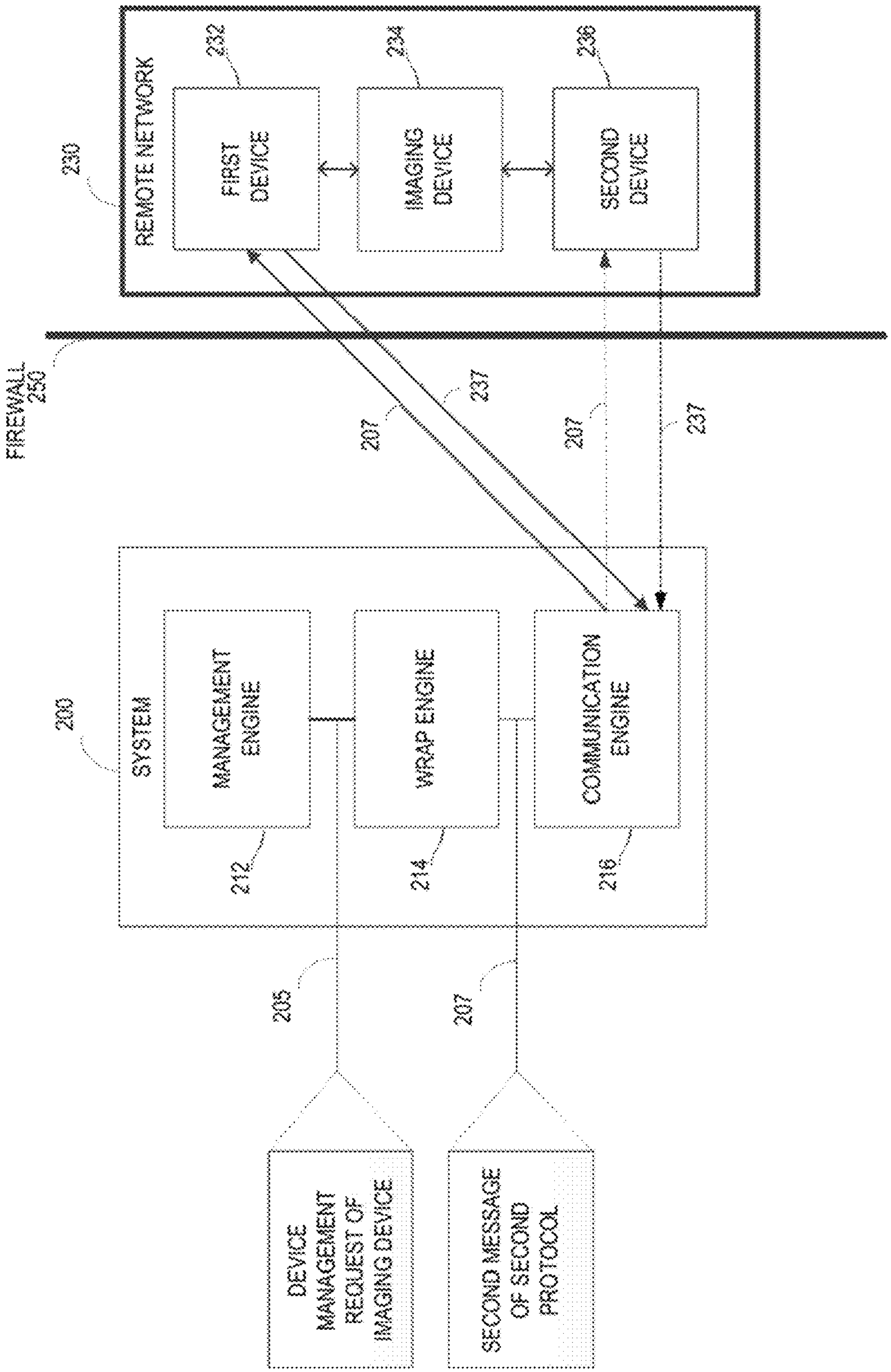
FIG. 2 is a block diagram of an example system to provide a device management request to an imaging device in a remote network protected by a firewall.

FIG. 2 is a block diagram of an example system 200 to provide a device management request to a device in a remote network 230 protected by a firewall 250. System 200 and remote network 230 may be separated from each other by firewall 250 and communicate via a computer network (e.g., the Internet). In the example of FIG. 2, system 200 includes at least engines 212, 214, and 216, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 212, 214, and 216. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that, when installed, can be executed by the processing resource to implement at least engines 212, 214, and 216. In such examples, the machine-readable storage medium may be a portable medium, such as a CD. DVD, or flash drive, or a memory maintained by a computing device from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

In the example of FIG. 2, management engine 212 may generate a device management request 205 for device 234 in remote network 230 behind firewall 250. In the example of FIG. 2, device 234 may be an imaging device. Management engine 212 may include instructions to determine when to generate device management request 205. The device management request 205 may be of a device management protocol to manage imaging device 234. The system 200 need not receive a request from remote network 230 to generate device management request 205 in management engine 212.

In some examples, wrap engine 214 may wrap device management request 205 of imaging device 234 into a second message 207 of a second protocol. In some examples, the second protocol may be a persistent connection protocol or instant communication protocol. For example, the device management request 205 may be wrapped into XMPP by wrap engine 214 to generate second message 207.

Communication engine 216 may provide the second message 207 to first device 232 in remote network 230 through firewall 250. The first device 232 may provide (e.g., proxy) the device management request 207 to imaging device 234 via a local network. The first device 232 may acquire a device management response 237 from imaging device 234. In some examples, the first device 232 may provide device management response 237 to communication engine 216 through firewall 250.

In some examples, the system 200 may provide the device management request 207 to second device 236 in remote network 230 if device management response 237 is not received from first device 232. In such examples, second device 36 may receive device management response 237 from imaging device 234 and provide device management response 237 to communication engine 216 through firewall 250.

Figure 3:
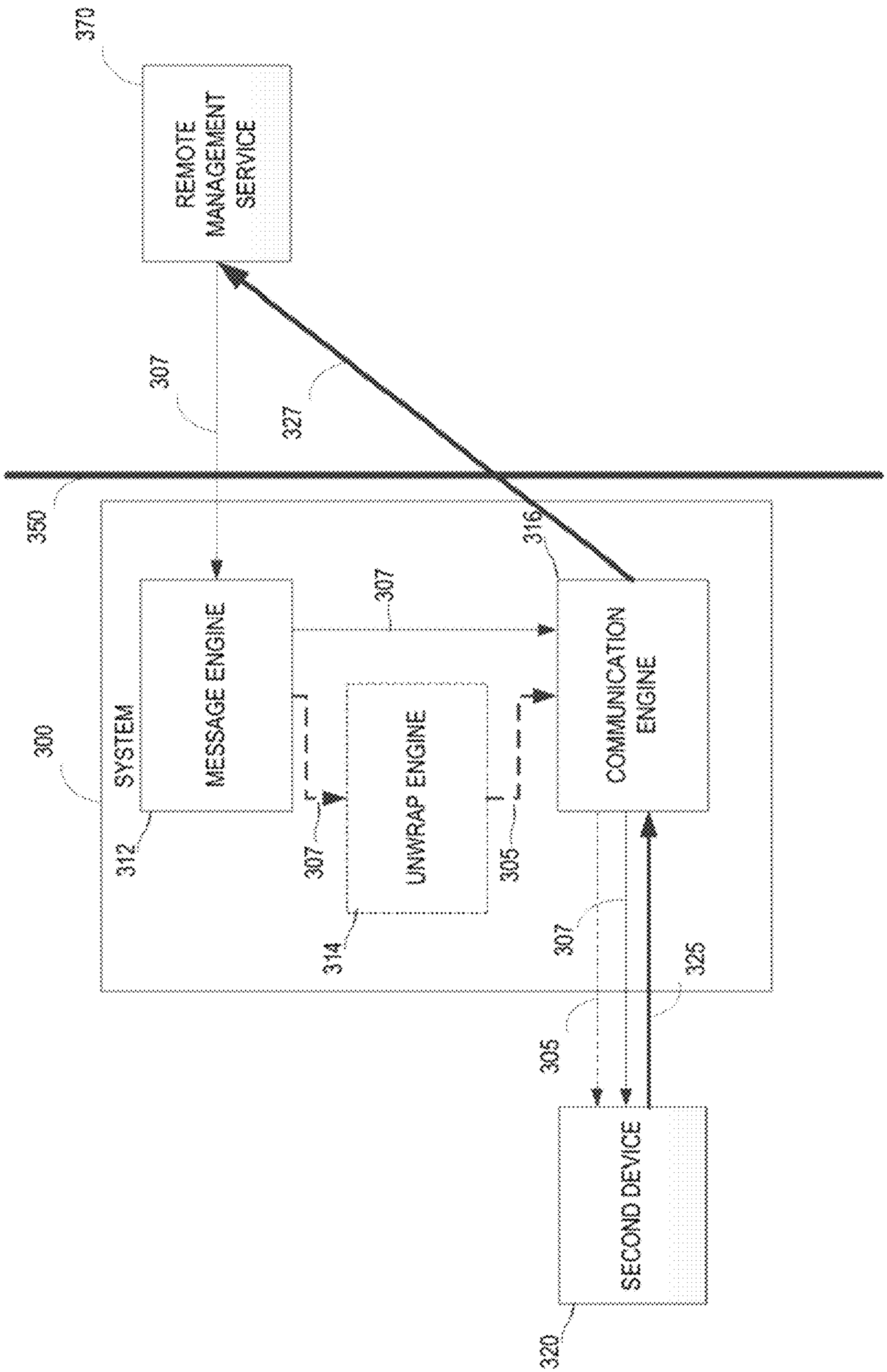
FIG. 3 is a block diagram of an example system to provide a device management request from a remote management service to a local network.

FIG. 3 is a block diagram of an example system 300 to provide a device management request 307 from a remote management 370 to a local network. System 300 and remote management service 370 may be separated from each other by firewall 350 and communicate via a computer network (e.g., the Internet). In some examples, the system 300 may be implemented in first device 232 or second device 236 of FIG. 2.

In the example of FIG. 3, system 300 includes at least engines 312, 314, and 316, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 312, 314, and 316. In such examples, system 300 may include the machine-readable storage medium storing the instructions and the processing resource to execute the instructions, or the machine-readable storage medium may be separate but accessible to system 300 and the processing resource.

In some examples, the instructions can be part of an installation package that, when installed, can be executed by the processing resource to implement at least engines 312, 314, and 316. In such examples, the machine-readable storage medium may be a portable medium, such as a CD, DVD, or flash drive, or a memory maintained by a computing device from which the installation package can be downloaded and installed. In other examples, the instructions may be part of an application, applications, or component already installed on system 300 including the processing resource. In such examples, the machine-readable storage medium may include memory such as a hard drive, solid state drive, or the like. In other examples, the functionalities of any engines of system 300 may be implemented in the form of electronic circuitry.

In the example of FIG. 3, message engine 312 may receive a first message 307 from the remote management service 370 through the firewall 360. First message 307 may be any type of message described above with respect to device management request 105 of FIG. 1 or second message 207 of FIG. 2.

Message engine 312 may provide the first message 307 to communication engine 307, in communication engine 316, the first message 307 may be provided to second device 320 via a local network. In some examples, second device 320 may respond to first message 307 with a device management response 325.

First message 307 may be a wrapped message as described above with respect to FIGS. 1-2. In such an example, message engine 312 may provide the first message 307 to unwrap engine 314. Unwrap engine 314 may unwrap first message 307 into a second message 305. Second message 305 may be any type of message described above with respect to device management request 205 of FIG. 2. Unwrap engine 314 may provide the second message 305 to communication engine 316. Communication engine 316 may provide the second message 305 to second device 320 via a local network.

In some examples, second device 320 may provide a device management response 325 to communication engine 316. In an example, communication engine 316 may wrap device management response 325 into a second device management response 327 of a first protocol and provide the second device management response 327 to remote management service 270 through firewall 350. In some examples, the first protocol may be a persistent connection protocol or instant communication protocol. For example, the device management response 325 may be wrapped into HTTP by communication engine 316.

Figure 4:
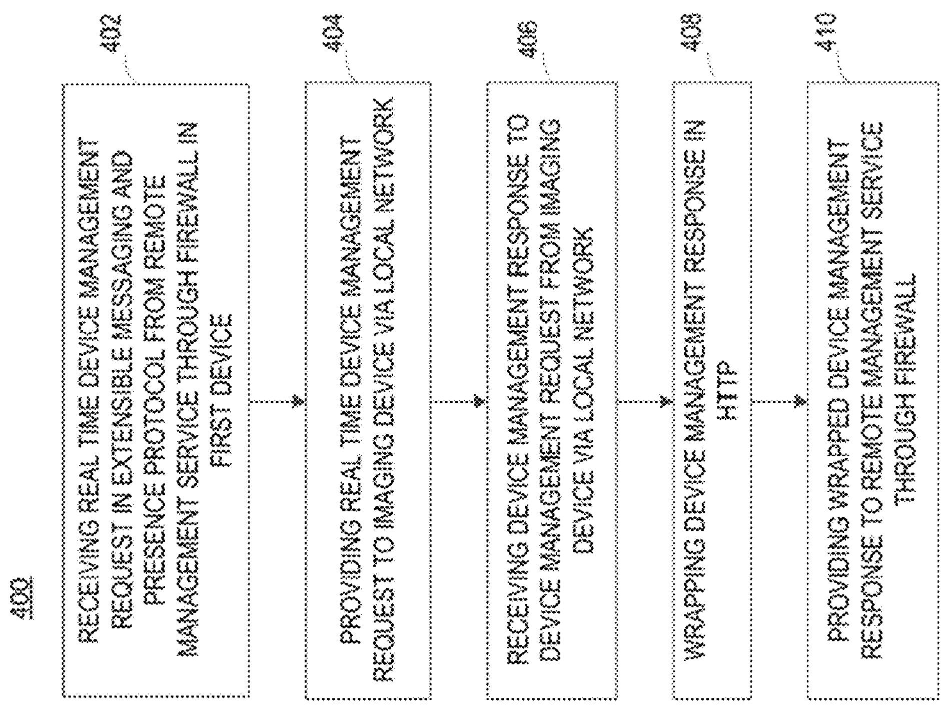
FIG. 4 is a flowchart of an example method for providing a device management request to a networked device from a remote management service.

FIG. 4 is a flowchart of an example method 400 for providing a device management request to a networked device from a remote management service. Although execution of method 400 is described below with reference to computing device 100 described above, other suitable systems (system 300) for the execution of method 400 can be utilized. Additionally, implementation of method 400 is not limited to such examples.

At 402 of method 400, computing device 100 may receive a device management request 105 from the remote management service through firewall 150 in computing device 100. Device management request 105 may be a real time management request in a first protocol. In the example of FIG. 4, the first protocol may be XMPP.

At 404, computing device 100 may provide device management request 105 to the second device via the local network. In the example of FIG. 3, the second device may be an imaging device.

At 406, computing device 100 may receive the device management response 107 from second device via the local network. In the example of FIG. 4, the second device may be an imaging device.

At 408, computing device 100 may wrap the device management response 107 in a second protocol. In the example of FIG. 4, the second protocol may be HTTP.

At 410, computing device 100 may provide the wrapped device management response to the remote management service through firewall 150.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium comprising instructions executable by a processing resource of a first device to:

receive by the first device a device management request of a first protocol, the first protocol being an instant communication protocol and a persistent communication protocol, from a remote management service over the Internet through a firewall that is separate from the first device, the first protocol able to traverse the firewall, an imaging device unable to communicate over the Internet, the first device and the imaging device behind the firewall;

unwrap by the first device the device management request into a second message of a second protocol, the second protocol being a device management protocol, the firewall not permitting messages of the second protocol to pass through the firewall;

provide by the first device the second message to the imaging device via a local network; and responsive to the first device receiving a device management response to the device management request from the imaging device via the local network, provide by the first device the device management response to the remote management service over the Internet through the firewall that is separate from the first device, wherein, responsive to the first device failing to receive the device management response, a second device receiving the device management request of the first protocol from the remote management service over the Internet through the firewall that is separate from the second device, providing the second message to the imaging device, receiving the device management response from the imaging device, and providing the device management response to the remote management service, and wherein the second device performs an action in accordance with the device management request and subsequently operates in accordance with the performed action.

2. The storage medium of claim 1, wherein the device management request is a real time management request of an imaging device.

3. The storage medium of claim 1, wherein the device management request is a message of a second protocol wrapped in a message of the instant communication protocol.

4. The storage medium of claim 3, wherein the instructions to provide the device management response to the remote management service further comprises instructions to:

wrap the device management response in a message of the instant communication protocol; and provide the wrapped device management response to the remote management service.

5. A system comprising:

a first device in a local network, the first device comprising hardware, including a processor and memory storing instructions executable by the processor to:

receive a device management request of a first protocol, the first protocol being an instant communication protocol and a persistent connection protocol, from a remote management service over the Internet through a firewall that is separate from the first device, the first protocol able to traverse the firewall, an imaging device unable to communicate over the Internet, the first device and the imaging device behind the firewall;

unwrap the device management request into a second message of a second protocol, the second protocol being a device management protocol, the firewall not permitting messages of the second protocol to pass through the firewall; and provide the second message to the imaging device via the local network, and responsive to receiving a device management response from the imaging device via the local network, provide the device management response to the remote management service over the Internet through the firewall that is separate from the first device, wherein, responsive to the first device failing to receive the device management response, a second device receiving the device management request of the first protocol from the remote management service over the Internet through the firewall that is separate from the second device, providing the second message to the imaging device, receiving the device management response from the imaging device, and providing the device management response to the remote management service, and wherein the second device performs an action in accordance with the device management request and subsequently operates in accordance with the performed action.

6. The system of claim 5, wherein the persistent connection protocol is an Extensible Messaging and Presence Protocol.

7. The system of claim 5, wherein the instructions are executable by the processor of the first device to further wrap the device management response in Hypertext Transfer Protocol and to provide the wrapped device management response to the remote management service.

8. The system of claim 5, wherein the device management protocol is Simple Network Management Protocol.

9. A method for controlling a device, comprising:

receiving, by a first device, a real time device management request of an Extensible Messaging and Presence Protocol (XMPP) that is an instant communication protocol and a persistent communication protocol from a remote management service over the Internet through a firewall that is separate from the first device, the first protocol able to traverse the firewall, an imaging device unable to communicate over the Internet, the first device and the imaging device behind the firewall;

unwrapping, by the first device, the real time device management request into a second message of a second protocol, the second protocol being a device management protocol, the firewall not permitting messages of the second protocol to pass through the firewall;

providing, by the first device, the second message to the imaging device via a local network;

responsive to the first device receiving a device management response to the device management request from the imaging device via the local network, wrapping, by the first device, the device management response in Hypertext Transfer Protocol (HTTP), and providing the wrapped device management response to the remote management service over the Internet through the firewall that is separate from the first device, wherein the first device receives the real time device management request from the remote management service, wherein, responsive to the first device failing to receive the device management response, a second device receiving the device management request of the first protocol from the remote management service over the Internet through the firewall that is separate from the second device, providing the second message to the imaging device, receiving the device management response from the imaging device, and providing the device management response to the remote management service, and wherein the second device performs an action in accordance with the device management request and subsequently operates in accordance with the performed action.

10. The method of claim 9, wherein the device management request is a message of a second protocol wrapped in XMPP.

11. The method of claim 10, wherein the device management request is a command to alter at least one setting of the imaging device.

12. The method of claim 11, wherein the device management request includes a command to enter a low power state of the imaging device.

* * * * *